United States Patent

Brooks et al.

[15] 3,671,762

[45] June 20, 1972

[54] THERMOSTAT SET

[72] Inventors: James Brooks, Hermosa Beach; Ralph E. Drummond, Cudahy; Frank J. Heinz, Garden Grove; William W. Chambers, Anaheim, all of Calif.

[73] Assignee: Robertshaw Controls Company, Richmond, Va.

[22] Filed: April 29, 1971

[21] Appl. No.: 138,440

[52] U.S. Cl. ..............................................307/117, 219/510

[51] Int. Cl. ........................................................H01h 37/12

[58] Field of Search ..................307/117; 340/227, 233, 417; 219/510; 73/339; 237/10

[56] References Cited

UNITED STATES PATENTS 3,556,151 2/1971 Wilburn................................307/117

*Primary Examiner*—Robert K. Schaefer
*Assistant Examiner*—William J. Smith
*Attorney*—Fulwider, Patton, Rieber, Lee & Utecht

[57] ABSTRACT

A thermostat set for selective connection with à center tap transformer and a temperature control device operator and to be selectively assembled to provide a thermostat with or without a control switch. The thermostat set includes a base including first through fourth electrical terminals and having a bridge circuit thereon which includes first and second resistance means formed with a node at their common end. The first resistance means is in the form of a temperature sensor. The base circuit includes rectifier means having its gate connected with the first node, lead means connecting the free end of the first resistance means with the first electrical terminal and the free end of the second resistance means with the second electrical terminal and the power circuit of the rectifier means with the third and fourth terminals. A first sub-base is provided which includes first and second input terminals for connection with opposite sides of said transformer and a third input terminal for connection with the center tap thereof, such sub-base further including first through fourth output terminals. A first sub-base circuit connects the respective first through third input terminals of such sub-base with the first through third output terminals thereof and the second input terminal with the fourth output terminal thereof. A second sub-base also includes first through third input terminals and first through fourth output terminals and second sub-base circuit means connects the first through third input terminals with the respective first through third output terminals and the second input terminal with the fourth output terminal. The second sub-base circuit further includes switch means for breaking the circuit through such second sub-base. Electrically conductive mechanical connector means is provided for selectively connecting the first through fourth terminals in the sub-base with the respective first through fourth output terminals of the respective first and second sub-bases whereby a workman may select either the first or second sub-base for assembly with the base to thereby provide a thermostat with or without switch means depending upon the requirements of the particular installation.

12 Claims, 13 Drawing Figures

INVENTORS.
JAMES BROOKS
RALPH E. DRUMMOND
FRANK J. HEINZ
BY WILLIAM W. CHAMBERS
Fulwider, Patton, Rieber, Lee and Utecht. ATTORNEYS INVENTORS.
JAMES BROOKS
RALPH E. DRUMMOND
FRANK J. HEINZ
BY WILLIAM W. CHAMBERS
Fulwider, Patton, Rieber, Lee, and Utecht. ATTORNEYS INVENTORS.
JAMES BROOKS
RALPH E. DRUMMOND
FRANK J. HEINZ
BY WILLIAM W. CHAMBERS
Fulwider, Patton, Rieber, Lee and Utecht. ATTORNEYS INVENTORS.
JAMES BROOKS
RALPH E. DRUMMOND
FRANK J. HEINZ
BY WILLIAM W. CHAMBERS
Fulwider, Patton, Rieber, Lee and Utecht. ATTORNEYS

THERMOSTAT SET

BACKGROUND OF THE INVENTION

1. Field of the Invention

The present invention relates to thermostat assemblies for controlling temperature change devices such as furnaces.

2. Description of The Prior Art

It has been common practice to provide wall thermostats which provide for automatic control of temperature change units such as furnaces or air conditioners and some prior art thermostats include switches for de-actuating the temperature change unit. However, such thermostats suffer the shortcomings that each thermostat must be custom made to provide for either automatic control with switching means or automatic control without switching means.

SUMMARY OF THE INVENTION

The present invention is characterized by a thermostat set which includes a base mounting the main portion of the thermostat circuitry and a plurality of different sub-bases on which the base may be mounted by mechanical connectors to provide for different control capabilities depending upon the particular combination of base and sub-bases.

An object of the present invention is to provide a thermostat set which enables a workman to selectively assemble the set in the field to provide for various control capabilities without necessity of stocking numerous different entire thermostats possessing the different desired characteristics.

Other objects and the advantages of the present invention will become apparent from a consideration of the following detailed description taken in conjunction with the accompanying drawings.

DESCRIPTION OF THE PREFERRED EMBODIMENTS

Figures 1, 2:
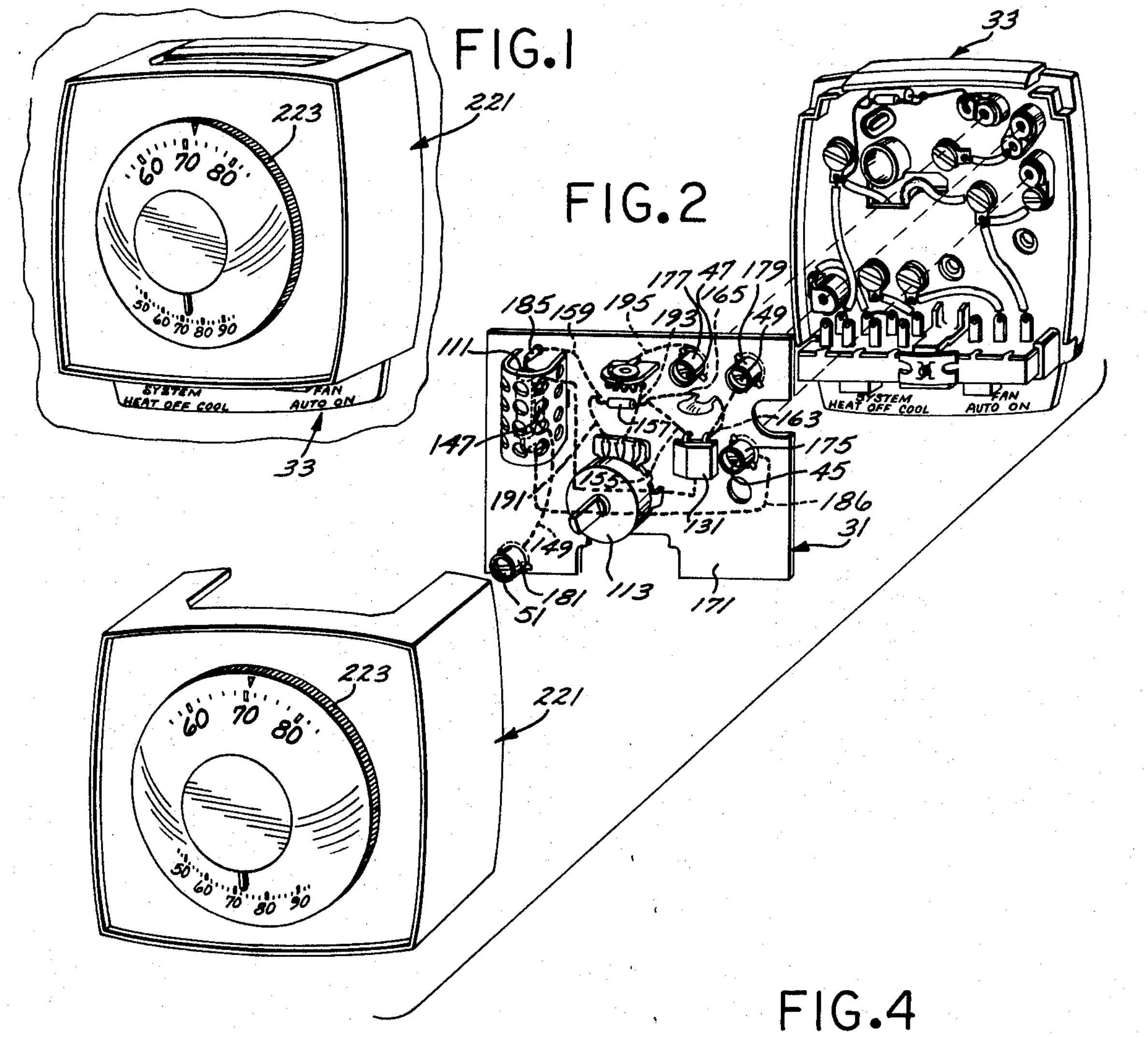
FIG. 1 is a perspective view of a thermostat cover included in a thermostat set embodying the present invention.
FIG. 2 is an exploded view of a portion of a thermostat set embodying the present invention.
Figure 3:
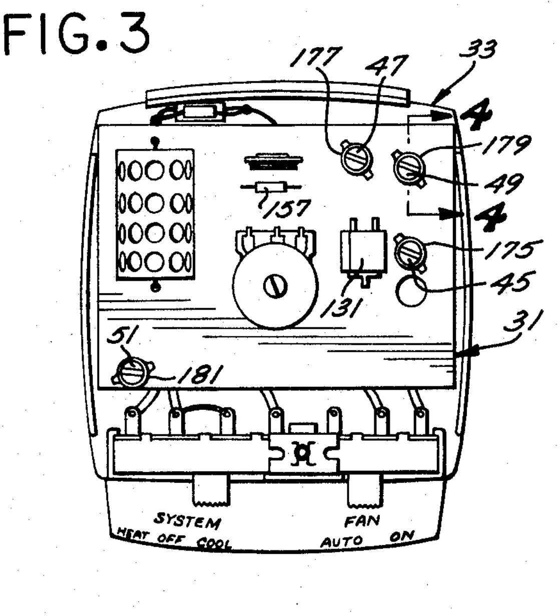
FIG. 3 is a front elevational view of an assembled base and sub-base included in the portion of the thermostat set shown in FIG. 2.
Figure 4:
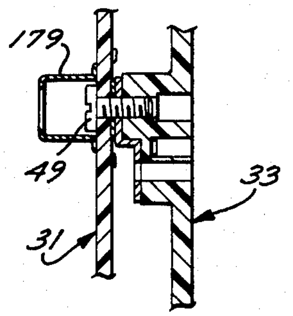
FIG. 4 is a vertical sectional view, in enlarged scale, taken along the line 4—4 of FIG. 3.
Figure 9:
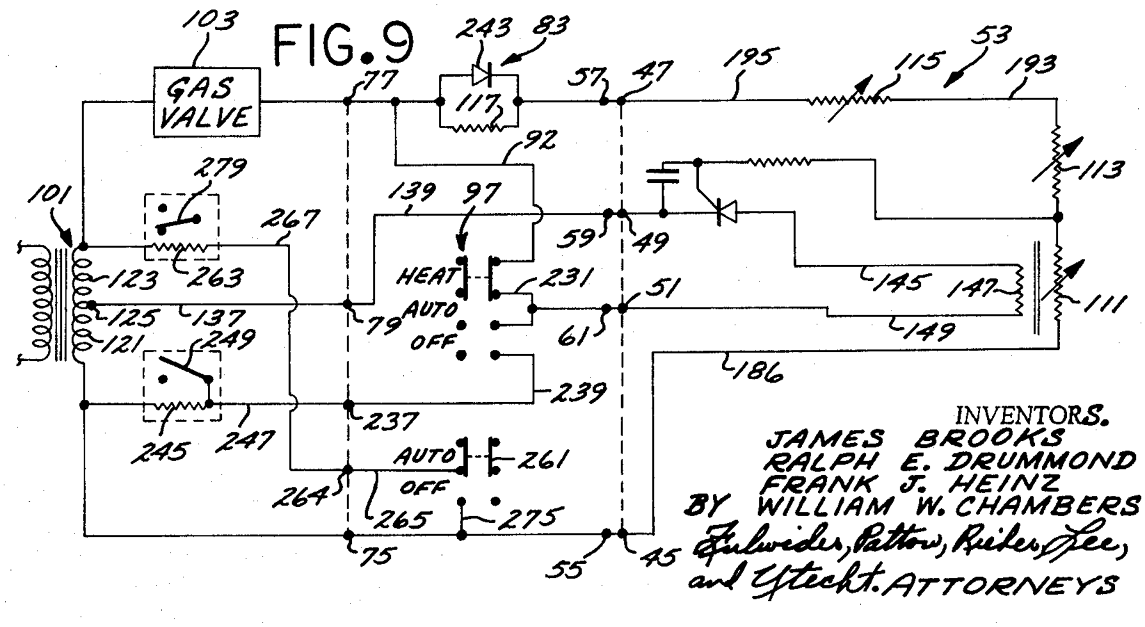
FIG. 9 is a schematic of an electrical circuit formed by the thermostat assembly shown in FIG. 2.

Referring to FIGS. 2 and 5–8, the thermostat set of present invention includes, generally, a single base 31 for selective assembly with a plurality of sub-bases 33, 35, 37, 39, and 41. Referring to FIGS. 2 and 9, the base includes first through fourth electrically conductive connector screws 45, 47, 49 and 51 and has a base circuit 53 mounted thereon and connected with the respective terminals 45–51. Each of the sub-bases 33–41 include respective first through fourth output terminals in the form of threaded bores 55–61 for receipt of the respective connector screws 45–51. Such sub-bases also include respective first through third input terminals in the form of threaded bores for receipt of input terminal screws 75, 77 and 79 and, further, include respective sub-base circuits 83–91 which connect the respective input terminals 75, 77 and 79 with the respective output terminals 55, 57 and 59. The input terminals 77 are connected with the respective output terminals 61 by means of leads 91 and the leads 91 in the circuits shown in FIGS. 9, 11, 12 and 13 for the respective sub-bases 33, 37, 39 and 41 include respective control switches, generally designated 97. Consequently, consequently, the base 31 may be assembled with any one of the sub-bases 33, 35, 37, 39, or 41 and the terminals 75 and 77 of the selective sub-base connected with opposite ends of a transformer 101 and the terminal 79 connected with the center tap thereof. The resultant thermostat will then provide for control of the furnace gas valve 103 in accordance with the characteristics of the particular sub-base 33–41, it being noted that the switches 97 enable the valve 103 to be turned off manually.

Figure 10:
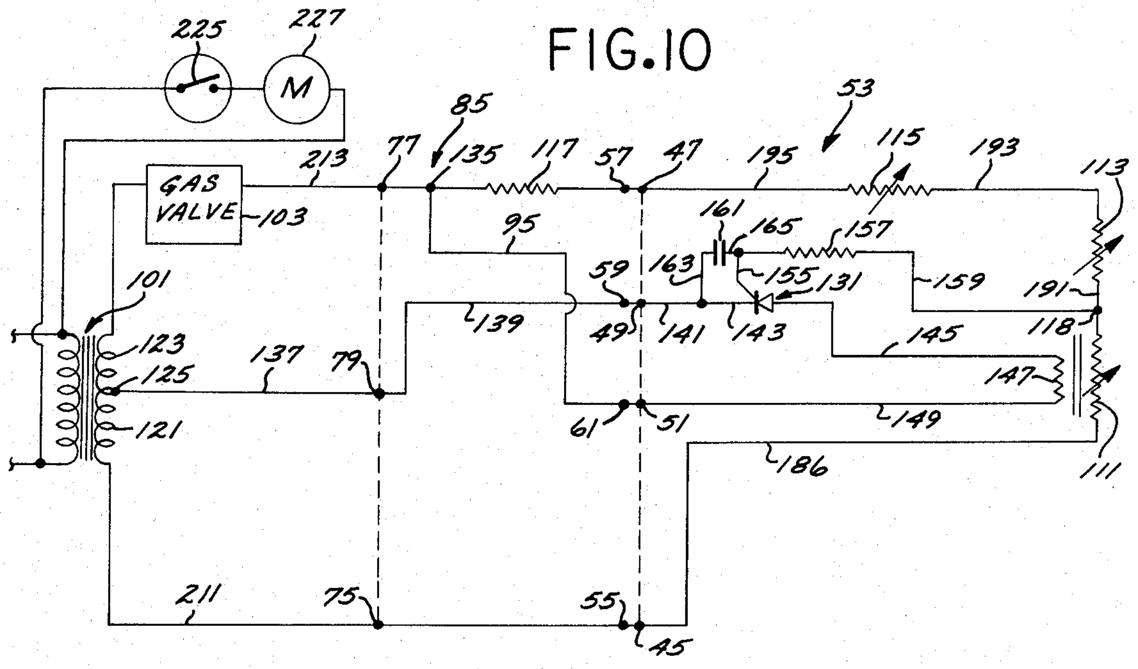
FIGS. 10–13 are schematics of electrical circuits formed by substitution of the respective sub-bases shown in FIGS. 5–8 for the sub-base included in the thermostat assembly in FIG. 2.

The control circuit shown in FIG. 10 is similar to that disclosed in U.S. Pat. No. 3,557,342 and is in the form of a temperature responsive bridge including a first leg formed by a negative temperature coefficient of resistance thermistor 111 and a second leg in the form of an adjustable potentiometer 113, a trimming potentiometer 115 and a current limiting resistor 117. The fourth and fifth legs of the bridge are then formed by the opposite halves 121 and 123 of the secondary coil of the transformer 101 such secondary coil being center tapped at 125.

Referring to FIG. 10, a silicon controlled rectifier (SCR), generally designated 121, has its anode-cathode circuit connected between the center tap 125 and a node in the form of a connector tab 135 projecting from the terminal tab for the screw 77 of the sub-base 35 by means of leads 137, 139, 141, 143, 145, feedback resistor 147 and leads 149 and the lead 95. The gate of the SCR 131 is connected with the bridge node 118 by means of a lead 155, current limiting resistor 157 and lead 159. A capacitor 151 is connected between the gate and cathode of the SCR 131 by means of leads 163 and 165.

Referring to FIG. 2, the base 31 includes an electrical insulating mounting board having bores formed therethrough, such bores being formed on the back side of such board by electrically conductive bosses which receive the respective connector screws 45, 47, 49 and 51 and form part of the printed circuit 53. Captive sleeves 175, 177, 179 and 181 are mounted over such bores for receipt of the heads of the respective screws 45–51 to hold such screws captive on the board 31 while permitting rotation thereof.

With continued reference to FIGS. 2 and 10, the thermistor 111 is formed on its opposite ends with respective terminal leads 185 which are bent to project downwardly and extend through bores formed in the board 171. One end of the thermistor 111 is connected with one end of the gate resistor 157 by means of the lead 159 which is printed on the back side of such board, the same end of the resistor 157 being connected with one end of the adjustment potentiometer 113 by means of a printed lead 191. The opposite end of the potentiometer 113 is connected with one end of the trimming potentiometer 115 by means of a printed lead 193 and the opposite end of such trimming potentiometer is connected with the electrically conductive boss by means of a printed lead 195, such boss being threaded to the connector screw 47. The end of the gate resistor 157 opposite that connected to the thermistor 111 is connected with the gate of the SCR 131 by means of the printed lead 155 and also with one side of the capacitor 161 by means of the printed lead 165. The opposite side of the capacitor 161 is connected with the cathode of the SCR 131 by means of the printed lead 163. The anode of the SCR 131 is connected with one end of the feedback resistor 147 by means of the printed lead 145 and such resistor is mounted on the board 31 in heat exchange relationship with the thermistor 111. The opposite end of the resistor 147 is connected with the boss for the connector screw 151 by means of a printed lead 149.

One end of the thermistor 111 is connected with the boss for the connector screw 45 by means of a lead 186 printed on the back side of the board 31.

Figures 5, 6, 7, 8:
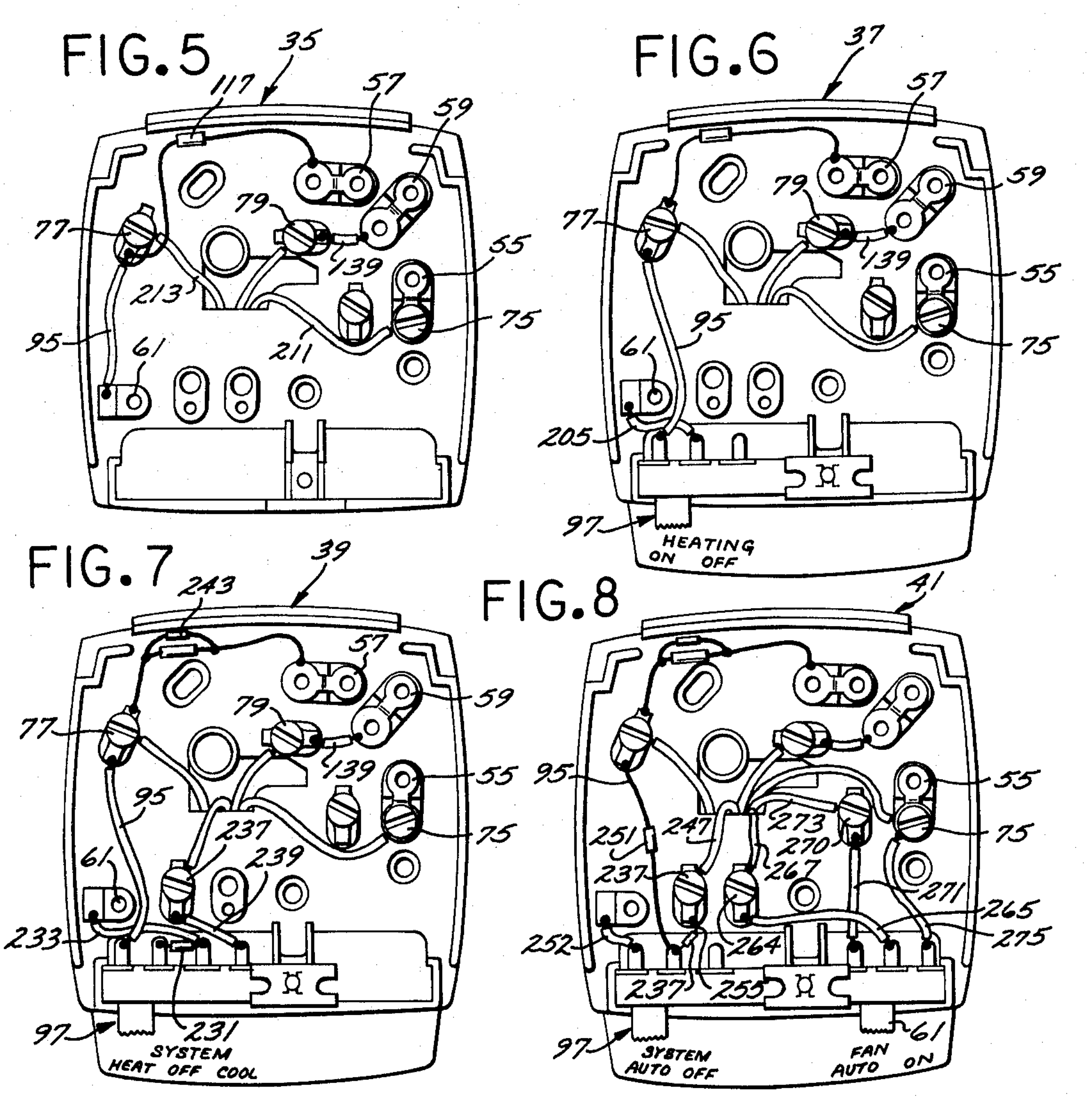
FIGS. 5–8 are elevational front views of thermostat sub-bases which may be selectively substituted for the sub-base included in the thermostat assembly shown in FIG. 2.

Referring to FIG. 5, the sub-base 35 is in the form of a plastic housing having the terminal tabs forming the bores for the screws 55–61 mounted on raised bosses formed therein. The terminal tab forming the output terminal bore 55 also forms an input bore for receipt of the output terminal screw 75. The terminal tab forming the output terminal bore 57 is connected with the terminal tab forming a bore for the input terminal screw 77 by means of the current limiting resistors 117 and such latter mentioned tab is also connected with the output terminal tab 61 by means of the lead 95. The output terminal forming the output terminal bore 69 is connected with the terminal tab forming the bore for the input terminal screw 79 by means of the lead 139.

Referring to FIG. 6, the sub-base 37 is substantially the same as the sub-base 35 except that the control switch 97 is mounted on the lower extremity thereof and has one side thereof connected to the input terminal screw 77 by means of the lead 95 and the opposite side connected with the output terminal 61 by means of a lead 205.

In operation, the installing workman will normally carry a supply of bases 31 and various sub-bases 33–41 in his inventory and when a thermostat is to be installed pursuant to a specification that calls for thermostatic control without a manual control switch, he will assemble the base 31 on the sub-base 37 by merely inserting the connector screws 45–51 in the respective output bores 55–61 to thereby form the respective base ans sub-base circuits 85 and 53 shown FIG. 10. The input terminals 75 and 77 of the sub-base will be connected with opposite ends of the secondary coil of the transformer 101 by means of respective leads 211 and 213, with the furnace gas valve 103 being included in the leads 213. Also, the input screw 79 will be connected with the transformer center tap 125 by means of the lead 137. The thermostat assembly will then be mounted on a wall of the room in which the temperature is to be controlled and a cover, generally designated 221 will be mounted thereon with the control dial 223 fitting on the control shaft of the adjustment potentiometer 113. The control dial 223 may then be adjusted to adjust the potentiometer 113 to set the circuit for the desired temperature.

As long as the temperature being sensed remains above the selected temperature, the temperature responsive bridge will remain balanced thereby providing insufficient voltage difference between the nodes 125 and 118 to trigger the SCR 131. However, when the temperature being sensed drops below the selected level, the thermistor 111 will be cooled to increase the resistance thereof to unbalance the circuit. Thus, when the top end of the transformer 101 is positive respective to the bottom end the node 118 will be driven sufficiently positive with respect to the node 125 to produce a gating voltage between the cathode and gate of the SCR 131 to trigger such SCR thereby providing for current flow through the anode, cathode circuit thereof and through the gas valve 103 to energize such gas valve and initiate operation of the furnace (not shown). In the embodiment shown, a thermostatic switch 225 is provided in the furnace for being closed after heating thereof is commenced to energize a blower drive motor 227 to provide for forced air heating.

When the temperature of the environment being sensed is heated above the selected temperature to heat the thermistor 111 above the set temperature, the resistance of such thermistor will be decreased sufficiently to re-balance the bridge and discontinue the gating voltage between the cathode and gate of the SCR 131 to de-energize the gas valve 103.

Figure 11:
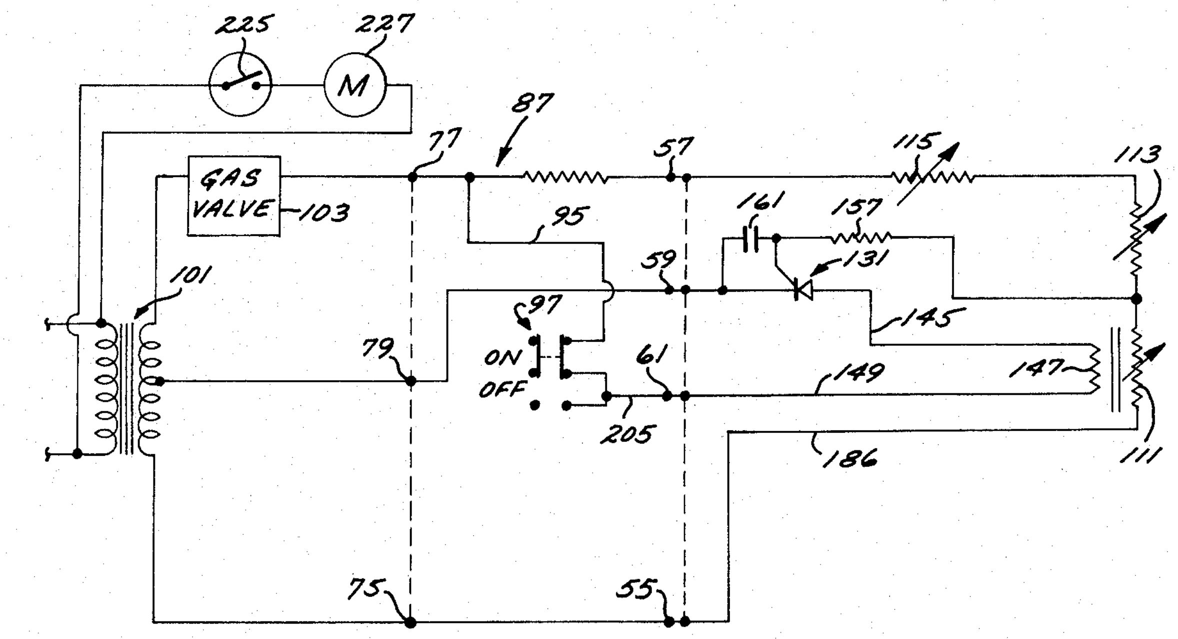

For installations where the specification calls for a thermostat assembly including a control valve 97, the installing workman can select the sub-base 37 for use with the base 31. Again, such base 31 is mounted on the sub-base by the connector screws 45–51 to provide the bridge circuit shown in FIG. 11. Operation of the circuit shown in FIG. 11 is the same as that for the circuit shown in FIG. 10 except that the manual switch 97 may be opened to de-energize the gas valve 103 even though the sensed temperature may be below the set temperature for the thermostat.

Figure 12:
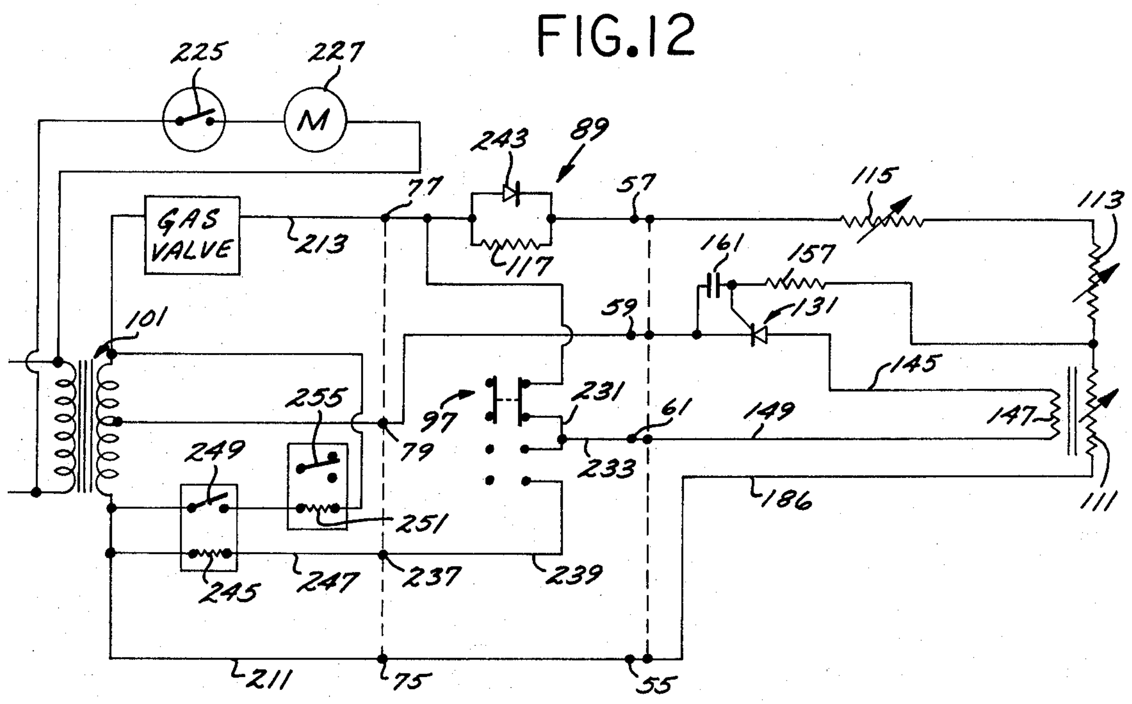

The sub-base 39 shown in FIGS. 7 and 12 is similar to that shown in FIG. 6 except that the control switch 97 is a three-position switch which has one terminal thereof connected with the input terminal 77 by means of the lead 95, the second and third terminals thereof being connected together by means of a lead 231 and such second and third terminals then being connected with the input terminal 61 by means of a lead 233. The remaining terminal of a switch 97 shown in FIG. 7 is connected with a cooling input terminal 237 by means of a lead 239. Still referring to FIG. 7, a diode 245 is connected in parallel with the resistor 117.

In operation, the base 31 is mounted on the sub-base 39 to form the circuit shown schematically in FIG. 12, and the cooling terminal screw 37 connected with a cooling operator heat motor 245 by means of a lead 247. The heat motor 245 is disposed in heat exchange relationship with a thermostatic switch 249, which switch is closed in response to heating thereof to provide current to a second heat motor 251 that closes a thermostatic switch 255 connected in series with an air conditioning unit. Thus, with the switch 97 in the solid line heating position shown in FIG. 12, the gas valve 203 will be controlled as described hereinabove. When it is desirable to de-energize both he furnace and air conditioner, the switch 97 is switched to its central position to discontinue current to the gas valve 203 and also to the heat motor 245. During warmer seasons when cooling is desired, the switch 97 may be switched to the lower position shown in FIG. 12 to complete a circuit through the cooling heat motor 245. With the switch 97 in its cooling position, when the temperature of the environment being sensed raises above a selected temperature, the thermistor 111 will be heated sufficiently to decrease the resistance thereof to unbalance the temperature responsive bridge to provide a triggering current to the gate of SCR 131. Thus, when the top end of the transformer 101 is positive in respect to the bottom end, the node 118 will be sufficiently positive with respect to the node 125 to impose a gating voltage on the cathode gate circuit of the SCR 131 to trigger such SCR and initiate current flow through the cathode-anode circuit thereof and through the lead 149, switch 97 and leads 239 and 247 to the cooling heat motor 245. Energization of the heat motor 245 will heat the thermostatic switch 249 to close such switch and energize the heat motor 251 to heat the thermostatic switch 255 and effect closure thereof to energize the air conditioner (not shown).

Figure 13:
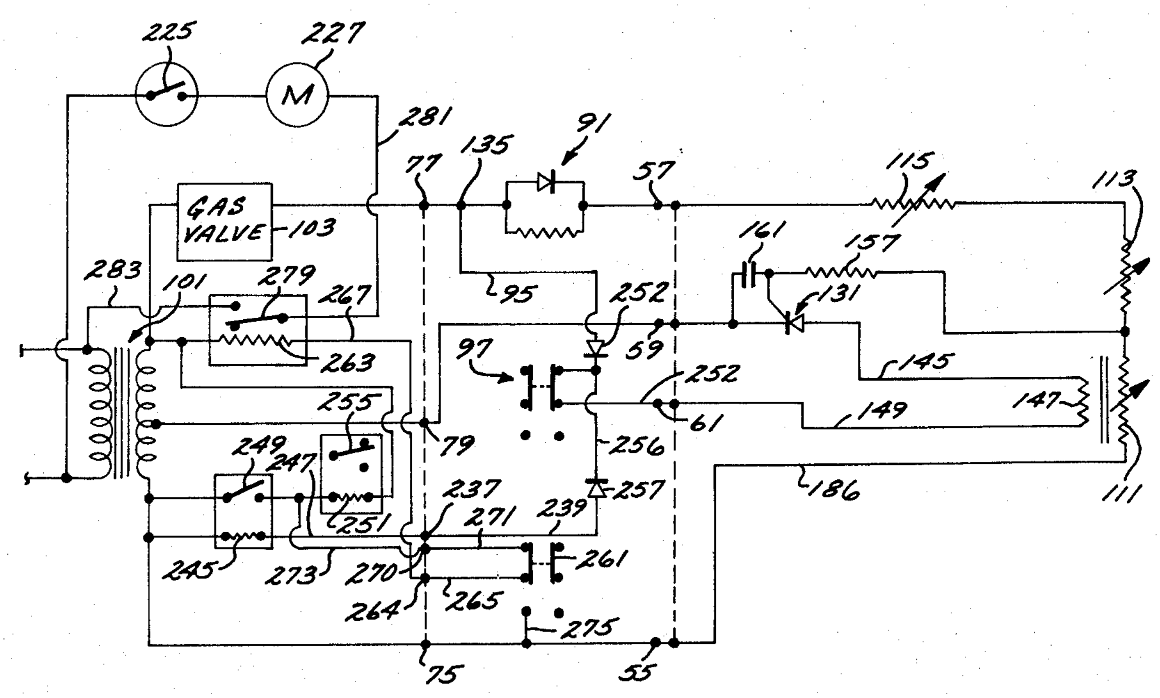

The sub-base 41 shown in FIGS. 8 and 13 is similar to the sub-base shown in FIG. 7 except that it provides for automatic energization of either a furnace or air conditioner depending on the temperature sensed and provides for manual energization of the blower motor 227 irrespective of temperature.

Still referring to FIGS. 8 and 13, the one side of the control switch 97 is connected with the input terminal 77 by means of the lead 95 and such lead 95 includes a blocking diode 252. Such one side of the switch 97 is also connected with the cooling input terminal 257 by means of a lead 256 which also includes a blocking diode 257 and the opposite side of such switch is connected with the terminal 61 by means of a lead 252.

A fan control switch 261 is also mounted on the sub-base 41 and has one terminal thereof connected with a manual control input terminal 264 by means of a lead 265, such terminal being connected with the blower control heat motor 263 by means of a lead 267. A second terminal of the switch 61 is connected with an automatic control terminal 270 in the sub-base 41 by means of a lead 271, such terminal 271 being connected with the time delay switch 249 by means of a lead 273. The third terminal of such switch 61 is connected with the input terminal 75 by means of a lead 275. Disposed in heat exchange relationship with the blower heat motor 263 is a thermostatic switch 279 which is connected with the fan motor 227 by means of leads 281 and 283.

In operation, the sub-base 41 will be selected for assembly with the base 31 when the specification calls for automatic heating and automatic cooling as well as manual blower control. With the switch 97 in the position shown in FIG. 13, when the thermistor 111 cools sufficiently below the selected temperature to unbalance the temperature responsive bridge, the node 118 will be sufficiently positive with respect to the node 125 each time the top end of the transformer 101 is positive with respect to the bottom end to thereby provide a triggering current to the gate of the SCR 131 to trigger such SCR. It will be noted that when the top end of the transformer is positive with respect to the bottom end the diode 257 will serve to block current flow downwardly (FIG. 13) through the lead 95 to the lead 265 and to the bottom end of the transformer 101 to thereby direct such current through the leads 149 and 145 to the power circuit of the SCR 131. Current flow through the anode-cathode circuit of the SCR 131 will energize the gas valve 103 to initiate heating of the furnace (not shown). Subsequently, the blower switch 225 will be heated and closed to energize the blower motor 227 to force air through such furnace. When the environment is heated sufficiently to warm the thermistor 111 to the selected temperature, the bridge will be rebalanced and triggering of the SCR 131 discontinued to de-energize the gas valve 103.

When the temperature of the environment raises above the selected temperature, the thermistor 111 will be heated sufficiently to reduce the resistance thereof to unbalance the bridge and cause the node 118 to be driven positive with respect to the node 125 on every half cycle when the bottom end of the transformer is positive with respect to the top end thereof to thereby trigger the SCR 131 on such half cycles. The triggering of the SCR 131 will effect current flow through the anode-cathode circuit thereof and through the leads 145, 149, 255, 257 and 239 through the cooling heat motor 245 to thereby commence heating thereof. Heating of the cooling heat motor 245 will effect closure of the thermostatic switch 249 to energize the heat motor 251 to heat and close the switch 255 controlling the air conditioning unit.

Assuming the fan switch 261 is in the position shown in FIG. 13, closure of the thermostatic switch 239 will also energize the lead 273, 275 and 265 to energize the fan heat motor to heat the thermostatic switch 139 to effect closure thereof thereby energizing the fan motor 227 to force air in heat exchange relationship with the air conditioning unit (not shown) to accelerate cooling of the environment.

When the environment has been cooled to the desired temperature, the temperature responsive bridge will be balanced and triggering of the SCR 131 discontinued.

If at any time it is desirable to operate the blower motor 227 when neither the furnace nor air conditioning unit are operating, the fan switch 261 may be moved to its lower position shown in FIG. 13 to energize the heat motor 263 and effect closure of the switch 279.

The sub-base shown in FIGS. 2 and 9 is similar to that shown in FIG. 8 except that there is no provision for automatically changing over from heating to cooling in response to temperature raise above a predetermined level. The sub-base 33 has a three-position switch 97 mounted thereon with such switch being wired similar to the switch 97 included in the sub-base 39. The fan switch 261 has one terminal thereof connected with the terminal screw 75 by means of the lead 275 and a second terminal thereof connected with the terminal 264 by means of the lead 265, such terminal 264 being connected with the blower control heat motor 263 by means of the lead 267. Consequently, operation of the thermostat assembly formed by the sub-base 33 and base 31 is similar to that for the assembly including the sub-base 39 except that the fan switch 251 may be turned to its on position to energize the fan heat motor 263 irrespective of operation of the furnace or air conditioner.

From the foregoing it will be clear that the thermostat set of present invention provides for convenient assembly of a base with any selected sub-base from the set to provide numerous different control functions. It should be noted that the base 31 which includes the relatively more expensive components of the set is the same for all combinations thereby enabling the user to stock only one model of base for use with the numerous different sub-bases.

Various modifications and changes may be made with regard to the foregoing detailed description without departing from the spirit of the invention.

What Is Claimed Is:

1. A thermostat set for selective assembly and connection to the opposite ends and center tap of a transformer, said set comprising:

a base including first, second, third and fourth electrical terminals;

a base bridge circuit mounted on said base and including first and second resistance means forming first and second bridge legs and defining a first node at their common ends said first resistance means being in the form of a temperature sensor, gate controlled rectifier means having its power circuit connected with said first node, said base bridge circuit further including lead means connecting the free end of said first resistance means with said first electrical terminal, the free end of said second resistance means with said second electrical terminal and the power circuit of said rectifier means between said third and fourth terminals;

a first sub-base including first, second and third input terminals and first, second, third and fourth output terminals;

first sub-base circuit means on said first sub-base for connecting said respective first, second and third output terminals with said first, second and third input terminals and said fourth output terminal to said second input terminal;

a second sub-base including first, second, and third input terminals and first, second, third and fourth output terminals;

second sub-base circuit means on said second sub-base for connecting said first, second and third output terminals with said respective first, second and third input terminals and said fourth output terminal with said second input terminal, said second sub-base circuit means further including switch means for breaking the circuit through the second sub-base circuit; and first, second, third and fourth electrically conductive mechanical connector means for selectively connecting said first, second, third and fourth terminals of said base with the respective first, second, third and fourth output terminals of said first and second sub-bases whereby said thermostat set can be selectively assembled with said base mounted on said first sub-base and the first and second input terminals thereof connected to the opposite ends of said transformer and said third input terminal connected with said center tap to provide a fully automatic thermostat and alternatively said set may be assembled with said base mounted on said second sub-base, the first and second input terminals thereof connected to the opposite ends of said transformer and said third input terminal connected with said center tap to enable the circuit through the assembled thermostat to be opened by actuating said switch.

2. A thermostat set as set forth in claim 1 wherein:

said base includes respective first, second, third and fourth through holes adjacent said respective first, second, third and fourth terminals;

said sub-bases include respective first, second, third and fourth threaded bores disposed adjacent said respective first, second, third and fourth outlet terminals and arranged in alignment with said respective first, second, third and fourth through holes; and said first, second, third and fourth connector means are in the form of respective electrically conductive screws for extension through said first, second, third and fourth holes to be selectively screwed into said respective first, second, third and fourth threaded bores.

3. A thermostat set as set forth in claim 1 wherein:

said second sub-base includes a fourth input terminal; and said second sub-base circuit includes lead means connecting one side of said switch means with said second and fourth input terminals and the opposite side of said switch means with said fourth input terminal and said switch includes a first position completing a circuit between said fourth output terminal and said second input terminal and a second position completing a circuit between said fourth input and output terminals whereby said second input terminal may be connected with a heating operator and said fourth input terminal may be connected with a cooling operator and said switch can be switched to said first position to provide for automatic operation of said heating operator and can be switched to said second position for automatic operation of said cooling operator.

4. A thermostat set as set forth in claim 1 that includes:

a third sub-base including first, second, third and fourth input and output terminals; and said third sub-base circuit means includes a two-position switch and lead means connecting said second input terminal with one side of said switch for energization thereof when said switch is in a first position, said lead means further connecting said fourth inlet terminal with said one side of said switch for energization thereof when said switch is in a second position and connecting the side of said switch opposite said one side with said fourth outlet terminal whereby said base may be selectively mounted on said third sub-base and said second and fourth input terminals in said third sub-base connected with respective heater and cooler operators so said switch can be switched to said first position for automatic control of said heating operator and to said second position for automatic control of said cooling operator.

5. A thermostat set as set forth in claim 1 wherein:

said second sub-base includes fourth and fifth input terminals; and said switch is in the form of a two-position selector switch and said second sub-base circuit means includes lead means connecting one side of said switch with said fourth output terminal and the opposite side of said switch with said second input terminal and with said fourth input terminal so switching of said switch to a first position will complete a power circuit to said second input terminal and switching of said switch to a second position will complete a power circuit to said fourth terminal, sad second sub-base circuit means further including a fan control switch connected between said first and fifth input terminals whereby said base may be selectively mounted on said second sub-base and said second, fourth and fifth input terminals connected with a heating operator, cooling operator and fan, respectively, and said selector switch positioned to select for thermostatic control of said heating or cooling operator and said fan switch positioned to selectively control said fan.

6. A thermostat set as set forth in claim 1 that includes:

a third sub-base including first, second, third, fourth and fifth input terminals and first, second, third and fourth outlet terminals;

third sub-base circuit means including a two-position selector switch and said second sub-base circuit means includes lead means connecting one side of said switch with said fourth output terminal and the opposite side of said switch with said second input terminal and with said fourth input terminal so switching of said switch to a first position will complete a power circuit to said second input terminal and switching of said switch to a second position will complete a power circuit to said fourth terminal, said second sub-base circuit means further including a fan control switch connected between said first and fifth input terminals whereby said base may selectively be mounted on said second sub-base and said second, fourth and fifth input terminals connected with a heating operator, cooling operator and fan, respectively, and said switch means positioned to select for thermostatic control of said heating or cooling operator and said fan switch positioned to selectively control said fan.

7. A thermostat set as set forth in claim 1 wherein:

said second sub-base includes a fourth input terminals, and said second sub-base circuit means includes first lead means connecting one side of said switch with said fourth output terminal and second and third lead means connecting the opposite side of said switch with said respective second and fourth input terminals, said second and third lead means including unidirectional current directing means for blocking current flow away from said switch means whereby said boss may be mounted on said second sub-base, said first and fourth input terminals connected with heating and cooling operators, respectively, and said switch means turned on to provide for automatic heating or cooling as dictated by said temperature sensor.

8. A thermostat set as set forth in claim 1 that includes:

a third sub-base including first, second, third and fourth input and output terminals;

third sub-base circuit means including first, second, and third lead means connecting said first, second and third input and output terminals together, fourth and fifth lead means connecting said fourth output terminal with said respective second and fourth input terminals, said fourth and fifth lead means including undirectional current blocking means for blocking current flow from said fourth output terminal to said respective second and fourth input terminals whereby said base may be selectively mounted on said third sub-base and said second and fourth input terminals connected with a heating operator and cooling operator, respectively, to provide for automatic heating and cooling as dictated by said temperature sensor.

9. A thermostat set as set forth in claim 7 wherein:

said second sub-base includes a fifth input terminal; and said second sub-base circuit means includes a fan switch connected between said first and fifth input terminals whereby said fifth input terminal may be connected with a blower fan so said fan can be controlled by said fan switch.

10. A thermostat set as set forth in claim 4 that includes:

a third sub-base including first, second, third, fourth and fifth input terminals and first, second, third and fourth outlet terminals;

third sub-base circuit means including a two-position selector switch and said second sub-base circuit means includes lead means connecting one side of said switch with said fourth output terminal and the opposite side of said switch with said second input terminal and with said fourth input terminal so switching of said switch to a first position will complete a power circuit to said second input terminal and switching of said switch to a second position will complete a power circuit to said fourth terminal, said second sub-base circuit means further including a fan control switch connected between said first and fifth input terminals whereby said base may selectively be mounted on said second sub-base and said second, fourth and fifth input terminals connected with a heating operator, cooling operator and fan and said selector switch positioned to select for thermostatic control of said heating or cooling operator and said fan switch positioned to selectively control said fan.

11. A thermostat set as set forth in claim 4 that includes:

a third sub-base including first, second, third and fourth input and output terminals;

third sub-base circuit means including first, second and third lead means connecting said first, second and third input and output terminals together, fourth and fifth lead means connecting said fourth output terminal with said respective second and fourth input terminals, said fourth and fifth lead means including undirectional current blocking means for blocking current flow from said fourth output terminal to said respective second and fourth input terminals whereby said base may be selectively mounted on said third sub-base and said second and fourth input terminals connected with heating operators and cooling operators, respectively, and provide for automatic heating and cooling as dictated by said temperature sensor.

12. A thermostat set as set forth in claim 10 that includes:

a third sub-base including first, second, third and fourth input and output terminals;

third sub-base circuit means including first, second and third lead means connecting said first, second and third input and output terminals together, fourth and fifth lead means connecting said fourth output terminal with said respective second and fourth input terminals, said fourth and fifth lead means including undirectional current blocking means for blocking current flow from said fourth output terminal to said respective second and fourth input terminals whereby said base may be selectively mounted on said third sub-base and said second and fourth input terminals connected with heating operators and cooling operators, respectively, and provide for automatic heating and cooling as dictated by said temperature sensor.

* * * * *